US011680184B2

(12) United States Patent
Loick et al.

(10) Patent No.: US 11,680,184 B2
(45) Date of Patent: Jun. 20, 2023

(54) ANTI-STICK PROCESSING AIDS AND USE THEREOF IN THE PRODUCTION OF WATER-ABSORBING PARTICLES

(71) Applicant: EVONIK SUPERABSORBER GMBH, Essen (DE)

(72) Inventors: Christoph Loick, Tönisvorst (DE); Scott Smith, Düsseldorf (DE); Anne Ix-Mund, Kerken (DE); Nicolaas De Bruin, Krefeld (DE); Laurent Wattebled, Düsseldorf (DE); Michael Azad, Reidsville, NC (US); Frank Loeker, Krefeld (DE)

(73) Assignee: Evonik Superabsorber GmbH, Essen (DE)

( * ) Notice: Subject to any disclaimer, the term of this patent is extended or adjusted under 35 U.S.C. 154(b) by 84 days.

(21) Appl. No.: 14/808,012

(22) Filed: Jul. 24, 2015

(65) Prior Publication Data

US 2016/0024332 A1    Jan. 28, 2016

Related U.S. Application Data

(60) Provisional application No. 62/028,872, filed on Jul. 25, 2014.

(30) Foreign Application Priority Data

Jul. 25, 2014 (EP) .................................... 14178470

(51) Int. Cl.
| | |
|---|---|
| C08F 220/06 | (2006.01) |
| B05D 1/00 | (2006.01) |
| C09D 133/14 | (2006.01) |
| C08F 2/44 | (2006.01) |
| B05D 1/02 | (2006.01) |
| B05D 1/28 | (2006.01) |
| C08K 5/06 | (2006.01) |
| C08K 5/098 | (2006.01) |
| C08K 5/1535 | (2006.01) |
| C08K 5/17 | (2006.01) |
| C08K 5/20 | (2006.01) |

(52) U.S. Cl.
CPC ............. *C09D 133/14* (2013.01); *B05D 1/02* (2013.01); *B05D 1/28* (2013.01); *C08F 2/44* (2013.01); *C08F 220/06* (2013.01); *C08K 5/06* (2013.01); *C08K 5/098* (2013.01); *C08K 5/1535* (2013.01); *C08K 5/17* (2013.01); *C08K 5/20* (2013.01); *B01J 2220/68* (2013.01)

(58) Field of Classification Search
CPC ......... C08F 220/06; C08K 5/06; C08K 5/098; C08K 5/17; C08K 5/20; C08K 5/1535
See application file for complete search history.

(56) References Cited

U.S. PATENT DOCUMENTS

| | | | | |
|---|---|---|---|---|
| 3,309,441 | A | * | 3/1967 | Burczyk .................. B29B 9/00 |
| | | | | 264/140 |
| 4,076,663 | A | | 2/1978 | Masuda et al. |
| 4,179,367 | A | | 12/1979 | Barthell et al. |
| 4,286,082 | A | | 8/1981 | Tsubakimoto et al. |
| 4,587,308 | A | | 5/1986 | Makita et al. |
| 5,264,161 | A | * | 11/1993 | Druskis ............ B29D 11/00192 |
| | | | | 134/25.4 |
| 5,409,771 | A | | 4/1995 | Dahmen et al. |
| 5,610,220 | A | | 3/1997 | Klimmek et al. |
| 5,639,510 | A | * | 6/1997 | Kindt-Larsen .......... B29C 33/58 |
| | | | | 427/133 |
| 5,672,633 | A | | 9/1997 | Brehm et al. |
| 5,712,316 | A | | 1/1998 | Dahmen et al. |
| 5,945,495 | A | * | 8/1999 | Daniel ..................... C08J 3/075 |
| | | | | 526/274 |
| 6,087,450 | A | | 7/2000 | Breitbach et al. |
| 6,143,821 | A | | 11/2000 | Houben |
| 6,565,768 | B1 | | 5/2003 | Dentler et al. |
| 6,906,131 | B2 | | 6/2005 | Ahmed et al. |

(Continued)

FOREIGN PATENT DOCUMENTS

| | | |
|---|---|---|
| CA | 2460152 A1 | 3/2003 |
| CN | 02819951 | 8/2007 |

(Continued)

OTHER PUBLICATIONS

European Search Report completed on Oct. 6, 2015 in EP 15 17 8164 (5 pages).
Azad et al., U.S. Appl. No. 14/246,451, filed Apr. 7, 2014.
German language European Search Report dated Sep. 8, 2014 in EP 14178470 (4 pages).
Loick et al., U.S. Appl. No. 14/639,177, filed Mar. 5, 2015.
Wattebled et al., U.S. Appl. No. 14/434,322, filed Apr. 8, 2015.

(Continued)

*Primary Examiner* — Karuna P Reddy
(74) *Attorney, Agent, or Firm* — Linda S. Li; Jason S. Ngui; Andrew H. Chung

(57) ABSTRACT

The present invention relates to an anti-stick processing aid for use in a process for producing water-absorbing polymers, comprising the steps of:
i) mixing ($\alpha$1) 0.1 to 99.999% by weight of polymerizable, ethylenically unsaturated monomers containing acid groups, or salts thereof, ($\alpha$2) 0 to 70% by weight of monomers copolymerizable with ($\alpha$1), ($\alpha$3) 0.001 to 10% by weight of crosslinkers, ($\alpha$4) 0 to 30% by weight of polymers, ($\alpha$5) 0 to 80% by weight of water, and ($\alpha$6) 0 to 20% by weight of assistants, (ii) free-radical polymerization with crosslinking to form a hydrogel polymer, (iii) drying the hydrogel polymer, (iv) grinding and sieving the hydrogel polymer, (v) surface postcrosslinking the hydrogel polymer and (vi) drying and finishing the water-absorbing polymer,
wherein the anti-stick processing aid is used before and/or in steps (iii).

5 Claims, No Drawings

(56) References Cited

U.S. PATENT DOCUMENTS

| | | |
|---|---|---|
| 6,911,572 B1 | 6/2005 | Bruhn et al. |
| 6,958,429 B2 | 10/2005 | Bruhn et al. |
| 7,163,969 B2 | 1/2007 | Ahmed et al. |
| 7,169,843 B2 | 1/2007 | Smith et al. |
| 7,173,086 B2 | 2/2007 | Smith et al. |
| 7,241,820 B2 | 7/2007 | Smith et al. |
| 7,335,713 B2 | 2/2008 | Lang et al. |
| 7,399,813 B2 | 7/2008 | Lang et al. |
| 7,427,650 B2 | 9/2008 | Smith et al. |
| 7,482,058 B2 | 1/2009 | Ahmed et al. |
| 7,488,541 B2 | 2/2009 | Ahmed et al. |
| 7,579,402 B2 | 8/2009 | Ahmed et al. |
| 7,777,093 B2 | 8/2010 | Smith et al. |
| 7,795,345 B2 | 9/2010 | Smith et al. |
| 7,812,082 B2 | 10/2010 | McIntosh et al. |
| 7,816,426 B2 | 10/2010 | Ahmed et al. |
| 7,842,386 B2 | 11/2010 | Loeker et al. |
| 7,910,688 B2 | 3/2011 | Tian et al. |
| 8,222,477 B2 | 7/2012 | Azad et al. |
| 8,236,876 B2 | 8/2012 | Ahmed et al. |
| 8,236,884 B2 | 8/2012 | Smith et al. |
| 8,288,002 B2 | 10/2012 | Loeker et al. |
| 8,309,682 B2 | 11/2012 | Tian et al. |
| 8,318,306 B2 | 11/2012 | Tian et al. |
| 8,318,895 B1 | 11/2012 | Tian et al. |
| 8,361,926 B2 | 1/2013 | Tian et al. |
| 8,420,567 B1 | 4/2013 | Naumann et al. |
| 8,466,228 B2 | 6/2013 | Smith et al. |
| 8,476,189 B1 | 7/2013 | Naumann et al. |
| 8,486,855 B2 | 7/2013 | Tian et al. |
| 8,487,049 B2 | 7/2013 | Tian et al. |
| 8,518,541 B2 | 8/2013 | Loeker et al. |
| 8,519,041 B2 | 8/2013 | Smith et al. |
| 8,580,953 B2 | 11/2013 | Frank et al. |
| 8,658,146 B2 | 2/2014 | Furno et al. |
| 8,686,216 B2 | 4/2014 | Wattebled et al. |
| 8,703,645 B2 | 4/2014 | Tian et al. |
| 8,734,948 B2 | 5/2014 | Tian et al. |
| 8,802,786 B2 | 8/2014 | Shi et al. |
| 8,822,582 B2 | 9/2014 | Smith et al. |
| 8,829,107 B2 | 9/2014 | Furno et al. |
| 8,859,701 B2 | 10/2014 | Loick et al. |
| 8,859,758 B2 | 10/2014 | Frank et al. |
| 8,883,881 B2 | 11/2014 | Smith et al. |
| 8,906,824 B2 | 12/2014 | Loeker et al. |
| 8,962,910 B2 | 2/2015 | Azad et al. |
| 2003/0181115 A1* | 9/2003 | Nagasuna ............... A61F 13/53 442/149 |
| 2005/0137546 A1 | 6/2005 | Joy et al. |
| 2007/0106239 A1 | 5/2007 | Riegel et al. |
| 2007/0232760 A1* | 10/2007 | Fujimaru ............... C08F 220/06 525/329.7 |
| 2010/0075844 A1 | 3/2010 | Loeker et al. |
| 2012/0001122 A1 | 1/2012 | Wattebled et al. |
| 2012/0145956 A1 | 6/2012 | Walden et al. |
| 2012/0302445 A1 | 11/2012 | Rudolph et al. |
| 2014/0054497 A1 | 2/2014 | Wattebled et al. |
| 2014/0257223 A1 | 9/2014 | Henn et al. |
| 2014/0306155 A1 | 10/2014 | Tian et al. |
| 2014/0306156 A1 | 10/2014 | Tian et al. |
| 2014/0309607 A1 | 10/2014 | Richlen et al. |
| 2014/0312273 A1* | 10/2014 | Wattebled ............... C08J 3/245 252/194 |
| 2014/0316040 A1 | 10/2014 | Shi et al. |
| 2014/0339469 A1 | 11/2014 | Furno et al. |
| 2015/0093575 A1 | 4/2015 | Naumann et al. |
| 2015/0157759 A1 | 6/2015 | Azad et al. |

FOREIGN PATENT DOCUMENTS

| | | |
|---|---|---|
| CN | 101240052 A | 8/2008 |
| CN | 104039847 A | 9/2014 |
| DE | 2706135 A1 | 8/1978 |
| DE | 3503458 A1 | 8/1985 |
| DE | 4020780 C1 | 8/1991 |
| DE | 4323001 | 7/1993 |
| DE | 4244548 A1 | 7/1994 |
| DE | 4418818 A1 | 1/1995 |
| DE | 4333056 A1 | 3/1995 |
| DE | 19543366 A1 | 5/1997 |
| DE | 19543368 A1 | 5/1997 |
| DE | 19825486 A1 | 2/2000 |
| DE | WO2013072268 A1 * | 5/2013 |
| EP | 919368 A2 * | 6/1992 |
| EP | 1438354 A1 | 7/2004 |
| EP | 1659144 A1 | 5/2006 |
| JP | 61081446 A * | 4/1986 |
| JP | 2001213914 A | 8/2001 |
| JP | 2006160774 A | 6/2006 |
| TW | 201503918 A | 2/2015 |
| WO | 2003025054 A1 | 3/2003 |
| WO | 2012143235 A1 | 10/2012 |
| WO | 2013072268 A1 | 5/2013 |
| WO | 2013104479 A1 | 7/2013 |
| WO | 2014168858 A1 | 10/2014 |
| WO | 2014/183987 A1 | 11/2014 |

OTHER PUBLICATIONS

Buchholz, Frederick L. and Graham, Andrew T., "Modern Superabsorbent Polymer Technology," copyright 1998, John Wiley & Sons, Inc., Chapter 4: "Analysis and Characterization of Superabsorbent Polymers," pp. 119-165 (49 pages).

* cited by examiner

ANTI-STICK PROCESSING AIDS AND USE THEREOF IN THE PRODUCTION OF WATER-ABSORBING PARTICLES

This application claims the benefit of U.S. Provisional Application No. 62/028,872 filed on Jul. 25, 2014 and European Application No. 14178470.2 filed on Jul. 25, 2014, the disclosures of which are expressly incorporated herein by reference.

FIELD

The present invention relates to anti-stick processing aids and use thereof in the production of water-absorbing particles.

BACKGROUND

Superabsorbent gels may be adjusted to low pH via the degree of neutralization. The lower the degree of neutralization, the greater the acidity of the gel pH, and greater the stickiness of the gels. It is a matter of observation here that the lower the pH of the superabsorbent gel, the greater the tendency to stick to production equipment, such as the trays and other surfaces of the dryers during the production process. This gives rise to problems with processing the superabsorbent gel, for example incomplete detachment from the trays, leading to the gel accumulation or building up on the continuous process equipment. This in the event of a backing-up, for example, of the material in the dryer can lead to damage, such as tearing of the dryer trays, and in the extreme case to dryer outage and process shut down. Some superabsorbent gels, in particular gels having a low degree of neutralization of approximately <75 mol % and/or pH approximately <6.5, are particularly prone to stick to the trays of the manufacturing plant belt dryer. This results in outage times and also high repair costs.

In an attempt to minimize the sticking of superabsorbent gel to dryer surfaces and other equipment, efforts have been made to permanently cover the surfaces with plastic, polyfluorohydrocarbon (example: Teflon®) and other hard coatings. Unfortunately, these surface coatings crack and degrade with time, can flake off to contaminate the product and can interfere with the drying efficiency.

Additives have also been applied directly to the wet, polymer gel. To be effective, these additives usually had to be added in undesirably high amounts, had a negative effect on the absorption properties of the final product or reduced the surface tension of the superabsorbent or of liquid contacting the superabsorbent to an undesirable level. For hygiene applications, it is critical that the superabsorbent does not significantly reduce surface tension of fluid in the hygiene article. This increases the ability of the fluid to flow back out of the article, leading to higher rewetting of the wearer's skin and even article leakage.

Additionally, some additives were not safe to use at the high temperatures found in the superabsorbent production process, without the risk of self-ignition.

The present invention had for its general object to overcome the prior art disadvantages.

One object of the present invention was therefore to provide an anti-stick processing aid for the production of water-absorbing polymers, which is used in the region of the dryers and particularly on the dryer trays to provide on-site control of polymer stickiness and build-up. Another object is to provide an anti-stick processing aid that is an additive that is not a permanent coating, is effective is small amounts and can be added only when needed.

This object is achieved by the subject matter of the independent claims. Advantageous configurations and developments which can occur individually or in combination form the subject matter of the dependent claims in each case.

The process of the present invention is further advantageous in that the performance properties of the water-absorbing polymer obtained using the process of the present invention are not adversely affected to anything but a minimal degree, or preferably not at all, by the use of the anti-stick processing aid, which is preferably used in minimal amounts. A further advantage is that the surface tension is not significantly reduced. The surface tension of the superabsorbent is maintained above 55 mN/m, preferably above 60 mN/m, more preferably above 65 mN/m.

Hygiene articles comprising water-absorbing polymers are obtainable via the process of the present invention that are at least equivalent in performance capability to hygiene articles comprising prior art water-absorbing polymers, obtained without the process of the present invention.

SUMMARY

One contribution to achieving the object referred to at the beginning is made by an inventive anti-stick processing aid preferably selected from the group of surface-active quaternary ammonium compounds, fatty acid esterquats, fatty acid diethanolamides, alkylphenol polyglycol ethers, sorbitan stearates, sorbitan fatty acid esters, sorbitan oleates, sorbitan laureates, cationic surfactants or nonionic surfactants.

The inventive anti-stick processing aid advantageously inhibits any sticking of the polymer to the metal equipment surfaces when the inventive anti-stick processing aid is, for example, applied to the dryer plates or trays which, in the course of the manufacture of the water-absorbing polymer, come into contact with the polymer gel or its precursor products. An example of how the anti-stick processing aid may be applied is its application in the form of a very dilute aqueous solution to the metal plates of a dryer in the region of the pivoting feed arm for example. The anti-stick processing aid may be for example applied by spraying, jetting, painting, spreading, brushing, coating or the like. The anti-stick processing aid is preferably a toxicologically harmless substance which is substantially inert, i.e., does not react with any of the components used for producing the water-absorbing polymer, and is even in major quantities thermally stable under the operating conditions of the dryer. Mixtures of two or more anti-stick processing aids may be used in the process of the present invention. Advantageously, the individual anti-stick processing aids or mixtures of two or more anti-stick processing aids may be used in different amounts relative to each other without their becoming thermally unstable under the given operating conditions of the dryer. In particular, using the anti-stick processing aid must not lead to any self-ignition reaction at temperatures up to 300° C., particularly up to 200° C.

DETAILED DESCRIPTION

The inventive process for producing a water-absorbing polymer comprises the steps of:
(i) mixing
   (α1) 0.1 to 99.999% by weight, preferably 20 to 98.99% by weight and more preferably 30 to 98.95% by weight of polymerizable, ethylenically unsaturated monomers containing acid groups, or salts thereof, or polymerizable, ethylenically unsaturated monomers including a protonated or quaternized nitrogen, or mixtures thereof, particular preference being given to mixtures including at least ethylenically unsaturated monomers containing acid groups, preferably acrylic acid, ($\alpha$2) 0 to 70% by weight, preferably 1 to 60% by weight and more preferably 1 to 40% by weight of polymerizable, ethylenically unsaturated monomers copolymerizable with ($\alpha$1), ($\alpha$3) 0.001 to 10% by weight, preferably 0.01 to 7% by weight and more preferably 0.05 to 5% by weight of one or more crosslinkers, ($\alpha$4) 0 to 30% by weight, preferably 1 to 20% by weight and more preferably 5 to 10% by weight of water-soluble polymers, ($\alpha$5) 0-80% by weight, preferably 2.5-70% by weight and more preferably 5-60% by weight of water, and ($\alpha$6) 0 to 20% by weight, preferably 0.01 to 7% by weight and more preferably 0.05 to 5% by weight of one or more assistants, where the sum of the weights of ($\alpha$1) to ($\alpha$5) is 100% by weight, (ii) free-radical polymerization with crosslinking to form a water-insoluble, aqueous untreated hydrogel polymer, (iii) drying the hydrogel polymer, (iv) grinding and sieving the hydrogel polymer to size, (v) surface postcrosslinking the ground and sieved hydrogel polymer and (vi) finishing the water-absorbing polymer, whereas an anti-stick processing aid is utilized alone or in mixtures preferably before and/or in steps (iii) and more preferably the anti-stick processing aid is added to the apparatus used subsequent to step (ii), preferably to the tray or drying belt, before step (iii). Preferably less than 10% of the superabsorbent polymer resulting in process step (iii) stick to the apparatus used subsequent to step (ii), preferably to the tray or the drying belt. Also preferably the surface tension of the resulting superabsorbent polymer is between 55 and 80 mN/m, preferably between 60 and 80 mN/m, more preferably between 65 and 80 mN/m.

In one embodiment, the inventive process for producing a water-absorbing polymer comprises the steps of:

(i) mixing ($\alpha$1) 0.1 to 99.999% by weight, preferably 20 to 98.99% by weight and more preferably 30 to 98.95% by weight of polymerizable, ethylenically unsaturated monomers containing acid groups, or salts thereof, or polymerizable, ethylenically unsaturated monomers including a protonated or quaternized nitrogen, or mixtures thereof, particular preference being given to mixtures including at least ethylenically unsaturated monomers containing acid groups, preferably acrylic acid, ($\alpha$2) 0 to 70% by weight, preferably 1 to 60% by weight and more preferably 1 to 40% by weight of polymerizable, ethylenically unsaturated monomers copolymerizable with ($\alpha$1), ($\alpha$3) 0.001 to 10% by weight, preferably 0.01 to 7% by weight and more preferably 0.05 to 5% by weight of one or more crosslinkers, ($\alpha$4) 0 to 30% by weight, preferably 1 to 20% by weight and more preferably 5 to 10% by weight of water-soluble polymers, ($\alpha$5) 0-80% by weight, preferably 2.5-70% by weight and more preferably 5-60% by weight of water, and ($\alpha$6) 0 to 20% by weight, preferably 0.01 to 7% by weight and more preferably 0.05 to 5% by weight of one or more assistants, where the sum of the weights of ($\alpha$1) to ($\alpha$5) is 100% by weight, (ii) free-radical polymerization with crosslinking to form a water-insoluble, aqueous untreated hydrogel polymer, (iii) drying the hydrogel polymer, (iv) grinding and sieving the hydrogel polymer to size, (v) surface postcrosslinking the ground and sieved hydrogel polymer and (vi) drying and finishing the water-absorbing polymer, and utilizes the anti-stick processing aid alone or in mixtures before and/or in step (iii) while the degree of neutralization of component ($\alpha$1) is at most 80%, preferably at most 70% and more preferably at most 65% and even more preferably at most 60% and wherein preferably the anti-stick processing aid is added to the apparatus used for drying, preferably to the tray or drying belt, before step (iii). Preferably less than 10% of the superabsorbent polymer gel resulting in process step (iii) stick to a drier plate section 5 seconds after a 180° turn when measured according to the determination of gel stickiness test. Also preferably the surface tension of the resulting superabsorbent polymer is between 55 and 80 mN/m, preferably between 60 and 80 mN/m, more preferably between 65 and 80 mN/m.

The anti-stick processing aids according to at least one of the above described inventive processes have excellent anti-stick properties without significantly reducing the absorption properties of the final superabsorbent polymer. As the determination of gel stickiness tests made by the applicant show, less than 10% of the superabsorbent polymer resulting from process step (iii) stick to the dryer plate section, 5 seconds after a 180° turn. So stickiness of the superabsorbent polymers is significantly reduced while the excellent properties of superabsorbent polymer are maintained.

The anti-stick processing aid(s) is/are preferably added before or during step (iii). Preferably, the anti-stick processing aid is used alone or in mixtures exclusively before and/or in, preferably before step (iii). More preferably, the anti-stick processing aid is added after step (ii) and before step (iii) and most preferably directly before step (iii).

The anti-stick processing aid used may be in particular any medium capable of avoiding the adhering/sticking of water-absorbing polymers or their precursors to the surfaces of the apparatus used, in particular in the apparatus used subsequent to step (ii). The anti-stick processing aids used according to the present invention are preferably not compounds as defined under ($\alpha$1) to ($\alpha$6).

In order that the superabsorbent production process may not be unduly restricted with regard to the parameters to be used, it is advantageous to use such anti-stick processing aids that do not lead to any self-ignition reaction at temperatures up to 200° C. or even above.

Preferred anti-stick processing aids are selected from the group of surface-active quaternary ammonium compounds, fatty acid esterquats, fatty acid diethanolamides, alkylphenol polyglycol ethers, sorbitan stearates, sorbitan fatty acid esters, sorbitan oleates, sorbitan laureates, cationic surfactants or nonionic surfactants or mixtures thereof.

Useful anti-stick processing aids are preferably those selected from the group of TEA esterquats, such as Servosoft®, coconut fatty acid amides, e.g., Comperlan® or compounds derivable from coconut fatty acid monoethanolamide, sorbitan fatty acid esters such as, for example, from the group of Span 20®, Span 40®, Span 60®, Span 80®, or sorbitan esters such as SPAN 65®, polyethoxylated fatty acid mixtures from the group of the Intrasol® family such as, for example, Intrasol® FS, Intrasol® FA, and the like.

Preference is given to compounds such as sorbitan fatty acid esters selected from the group of polyoxyethylene(20) sorbitan monolaurate, polyoxyethylene(20) sorbitan monopalmitate, polyoxyethylene(20) sorbitan monostearate, polyoxyethylene(20) sorbitan monooleate, polyoxyethylene (20) sorbitan tristearate, which may contain further added substances.

Particular preference is given to compounds such as cationic surfactants, in particular ester-quaternary compounds with different alkyl moieties such as, for example, stearyl, palmityl, methyl, benzyl or butyl moieties. Examples here are the cationic surfactants Servosoft®XW445PP (Elementis Specialties) and Rewoquat® (Evonik Industries AG).

It is particularly preferable to use anti-stick processing aids selected from the group of surface-active fatty acid esterquats, coconut fatty acid amides, coconut fatty acid monoethanolamides, sorbitan fatty acid esters, polyoxyethylene(20) sorbitan monolaurate, polyoxyethylene(20) sorbitan monopalmitate, polyoxyethylene(20) sorbitan monostearate, polyoxyethylene(20) sorbitan monooleate, polyoxyethylene(20) sorbitan tristearate, polyethoxylated fatty acid mixtures, more preferably from the group of fatty acid esterquats or sorbitan fatty acid esters.

When one of the above listed, preferred anti-stick processing aids is used in the inventive process, superabsorbent polymers are obtained that have superior anti-stick properties and also show excellent properties with respect to surface tension.

Hence, inventive processes are especially preferred where the anti-stick processing aid is selected from the group of surface-active quaternary ammonium compounds, fatty acid esterquats, fatty acid diethanolamides, alkylphenol polyglycol ethers, sorbitan stearates, sorbitan fatty acid esters, sorbitan oleates, sorbitan laureates, cationic surfactants or nonionic surfactants or mixtures thereof and wherein the surface tension of the resulting superabsorbent polymer is preferably between 55 and 80 mN/m, preferably between 60 and 80 mN/m, more preferably between 65 and 80 mN/m. Furthermore, inventive processes are especially preferred where the anti-stick processing aids selected from the group of surface-active fatty acid esterquats, coconut fatty acid amides, coconut fatty acid monoethanolamides, sorbitan fatty acid esters, polyoxyethylene(20) sorbitan monolaurate, polyoxyethylene(20) sorbitan monopalmitate, polyoxyethylene(20) sorbitan monostearate, polyoxyethylene(20) sorbitan monooleate, polyoxyethylene(20) sorbitan tristearate, polyethoxylated fatty acid mixtures, more preferably from the group of fatty acid esterquats or sorbitan fatty acid esters and wherein the surface tension of the resulting superabsorbent polymer is preferably between 55 and 80 mN/m, preferably between 60 and 80 mN/m, more preferably between 65 and 80 mN/m, wherein less than 10% of the superabsorbent polymer gel sticks to the dryer belt section, 5 seconds after a 180° turn of the dryer plate section in the determination of gel stickiness test as defined herein.

In this context, water-absorbing polymer structures preferred in accordance with the invention are especially fibers, foams or particles, fibers and particles being particularly preferred and particles most preferred.

The dimensions of polymer fibers preferred in accordance with the invention are such that they can be incorporated into or as yarns for textiles, and also directly into textiles. It is preferable in accordance with the invention that the polymer fibers have a length in the range from 1 to 500 mm, preferably 2 to 500 mm and more preferably 5 to 100 mm, and a diameter in the range from 1 to 200 denier, preferably 3 to 100 denier and more preferably 5 to 60 denier.

The dimensions of polymer particles preferred in accordance with the invention are such that they have a mean particle size to ERT 420.2-02 in the range from 10 to 3000 μm, preferably 20 to 2000 μm and more preferably 150 to 850 μm or 150 to 600 μm. In this context, it is especially preferable that the proportion of the polymer particles having a particle size within a range from 300 to 600 μam is at least 30% by weight, more preferably at least 40% by weight, further preferably at least 50% by weight and most preferably at least 75% by weight, based on the total weight of the water-absorbing polymer particles. In another embodiment of the inventive water-absorbing polymer structure, the proportion of the polymer particles having a particle size within a range from 150 to 850 μm is at least 50% by weight, more preferably at least 75% by weight, further preferably at least 90% by weight and most preferably at least 95% by weight, based on the total weight of the water-absorbing polymer particles.

The monoethylenically unsaturated monomers ($\alpha 1$) containing acid groups may be partially or fully neutralized, preferably partially. The requirement that the monoethylenically unsaturated acid-functional monomers ($\alpha 1$) have a degree of neutralization of at most 70 mol %, preferably of at most 65 mol %, more preferably of at most 60 mol %, yet more preferably of at most 55 mol % and most preferably a degree of neutralization in the range from 45 to 55 mol % is to be understood as meaning in this context that at most 70 mol %, at most 65 mol %, at most 60 mol % and/or at most 55 mol % of the acid groups of the monomers ($\alpha 1$) be present as deprotonated carboxylate groups. Neutralization can be effected with, for example, alkali metal hydroxides, alkaline earth metal hydroxides, ammonia, and carbonates and bicarbonates. In addition, any further base which forms a water-soluble salt with the acid is conceivable. Mixed neutralization with different bases is also conceivable. Preference is given to neutralization with ammonia or with alkali metal hydroxides, more preferably with sodium hydroxide or with ammonia.

Preferred monoethylenically unsaturated monomers ($\alpha 1$) containing acid groups are acrylic acid, methacrylic acid, ethacrylic acid, $\alpha$-chloroacrylic acid, $\alpha$-cyanoacrylic acid, $\beta$-methylacrylic acid (crotonic acid), $\alpha$-phenylacrylic acid, $\beta$-acryloyloxypropionic acid, sorbic acid, $\alpha$-chlorosorbic acid, 2'-methylisocrotonic acid, cinnamic acid, p-chlorocinnamic acid, $\beta$-stearyl acid, itaconic acid, citraconic acid, mesaconic acid, glutaconic acid, aconitic acid, maleic acid, fumaric acid, tricarboxyethylene and maleic anhydride, preference being given particularly to acrylic acid and methacrylic acid and most preferably to acrylic acid.

In addition to these monomers containing carboxylate groups, preferred monoethylenically unsaturated monomers ($\alpha 1$) containing acid groups additionally include ethylenically unsaturated sulfonic acid monomers or ethylenically unsaturated phosphonic acid monomers.

Preferred ethylenically unsaturated sulfonic acid monomers are allylsulfonic acid or aliphatic or aromatic vinylsulfonic acids or acrylic or methacrylic sulfonic acids. Preferred aliphatic or aromatic vinylsulfonic acids are vinylsulfonic acid, 4-vinylbenzylsulfonic acid, vinyltoluenesulfonic acid and styrenesulfonic acid. Preferred acryloyl- or methacryloylsulfonic acids are sulfoethyl(meth) acrylate, sulfopropyl(meth)acrylate, 2-hydroxy-3-methacryloyloxypropylsulfonic acid, and (meth) acrylamidoalkylsulfonic acids such as 2-acrylamido-2-methylpropanesulfonic acid.

Preferred ethylenically unsaturated phosphonic acid monomers are vinylphosphonic acid, allylphosphonic acid, vinylbenzylphosphonic acid, (meth)acrylamidoalkylphosphonic acids, acrylamidoalkyldiphosphonic acids, phosphonomethylated vinylamines and (meth)acryloylphosphonic acid derivatives.

Preferred ethylenically unsaturated monomers ($\alpha 1$) containing a protonated nitrogen are preferably dialkylaminoalkyl(meth)acrylates in protonated form, for example dimethylaminoethyl(meth)acrylate hydrochloride or dimethylaminoethyl(meth)acrylate hydrosulfate, and dialkylaminoalkyl(meth)acrylamides in protonated form, for example dimethylaminoethyl(meth)acrylamide hydrochloride, dimethylaminopropyl(meth)acrylamide hydrochloride, dimethylaminopropyl(meth)acrylamide hydrosulfate or dimethylaminoethyl-(meth)acrylamide hydrosulfate.

Preferred ethylenically unsaturated monomers ($\alpha 1$) containing a quaternized nitrogen are dialkylammonioalkyl (meth)acrylates in quaternized form, for example trimethylammonioethyl(meth)acrylate methosulfate or dimethylethylammonioethyl(meth)acrylate etho-sulfate, and (meth)acrylamidoalkyldialkylamines in quaternized form, for example (meth)acrylamidopropyltrimethylammonium chloride, trimethylammonioethyl(meth)acrylate chloride or (meth)acrylamidopropyltrimethylammonium sulfate.

Preferred monoethylenically unsaturated monomers ($\alpha 2$) copolymerizable with ($\alpha 1$) are acrylamides and methacrylamides.

Preferred (meth)acrylamides are, in addition to acrylamide and methacrylamide, alkyl-substituted (meth)acrylamides or aminoalkyl-substituted derivatives of (meth)acrylamide, such as N-methylol(meth)acrylamide, N,N-dimethylamino(meth)acrylamide, dimethyl(meth)acrylamide or diethyl(meth)acrylamide. Possible vinylamides are, for example, N-vinylamides, N-vinylformamides, N-vinylacetamides, N-vinyl-N-methylacetamides, N-vinyl-N-methylformamides, vinylpyrrolidone. Among these monomers, particular preference is given to acrylamide.

Additionally preferred as monoethylenically unsaturated monomers ($\alpha 2$) copolymerizable with ($\alpha 1$) are water-dispersible monomers. Preferred water-dispersible monomers are acrylic esters and methacrylic esters, such as methyl (meth)acrylate, ethyl(meth)acrylate, propyl(meth)acrylate or butyl(meth)acrylate, and also vinyl acetate, styrene and isobutylene.

Crosslinkers ($\alpha 3$) preferred in accordance with the invention are compounds having at least two ethylenically unsaturated groups within one molecule (crosslinker class I), compounds having at least two functional groups which can react with functional groups of monomers ($\alpha 1$) or ($\alpha 2$) in a condensation reaction (=condensation crosslinkers), in an addition reaction or in a ring-opening reaction (crosslinker class II), compounds having at least one ethylenically unsaturated group and at least one functional group which can react with functional groups of monomers ($\alpha 1$) or ($\alpha 2$) in a condensation reaction, in an addition reaction or in a ring-opening reaction (crosslinker class III), or polyvalent metal cations (crosslinker class IV). The compounds of crosslinker class I achieve crosslinking of the polymers through the free-radical polymerization of the ethylenically unsaturated groups of the crosslinker molecule with the monoethylenically unsaturated monomers ($\alpha 1$) or ($\alpha 2$), while the compounds of crosslinker class II and the polyvalent metal cations of crosslinker class IV achieve crosslinking of the polymers by a condensation reaction of the functional groups (crosslinker class II) or by electrostatic interaction of the polyvalent metal cation (crosslinker class IV) with the functional groups of monomers ($\alpha 1$) or ($\alpha 2$). In the case of the compounds of crosslinker class III, there is correspondingly crosslinking of the polymer both by free-radical polymerization of the ethylenically unsaturated group and by a condensation reaction between the functional group of the crosslinker and the functional groups of monomers ($\alpha 1$) or ($\alpha 2$).

Preferred compounds of crosslinker class I are poly(meth) acrylic esters which are obtained, for example, by the reaction of a polyol, for example ethylene glycol, propylene glycol, trimethylolpropane, 1,6-hexanediol, glycerol, pentaerythritol, polyethylene glycol or polypropylene glycol, of an amino alcohol, of a polyalkylenepolyamine, for example diethylenetriamine or triethylenetetramine, or of an alkoxylated polyol with acrylic acid or methacrylic acid. Preferred compounds of crosslinker class I are additionally polyvinyl compounds, poly(meth)allyl compounds, (meth)acrylic esters of a monovinyl compound or (meth)acrylic esters of a mono(meth)allyl compound, preferably of the mono(meth) allyl compounds of a polyol or of an amino alcohol. In this context, reference is made to DE 195 43 366 and DE 195 43 368. The disclosures are hereby incorporated by reference and are thus considered to form part of the disclosure.

Examples of compounds of crosslinker class I include alkenyl di(meth)acrylates, for example ethylene glycol di(meth)acrylate, 1,3-propylene glycol di(meth)acrylate, 1,4-butylene glycol di(meth)acrylate, 1,3-butylene glycol di(meth)acrylate, 1,6-hexanediol di(meth)acrylate, 1,10-decanediol di(meth)acrylate, 1,12-dodecanediol di(meth)acrylate, 1,18-octadecanediol di(meth)acrylate, cyclopentanediol di(meth)acrylate, neopentyl glycol di(meth) acrylate, methylene di(meth)acrylate or pentaerythritol di(meth)acrylate, alkenyldi(meth)acrylamides, for example N-methyldi(meth)acrylamide, N,N'-3-methylbutylidenebis (meth)acrylamide, N,N'-(1,2-dihydroxyethylene)bis(meth) acrylamide, N,N'-hexamethylenebis(meth)acrylamide or N,N'-methylenebis(meth)acrylamide, polyalkoxy di(meth) acrylates, for example diethylene glycol di(meth)acrylate, triethylene glycol di(meth)acrylate, tetraethylene glycol di(meth)acrylate, dipropylene glycol di(meth)acrylate, tripropylene glycol di(meth)acrylate or tetrapropylene glycol di(meth)acrylate, bisphenol A di(meth)acrylate, ethoxylated bisphenol A di(meth)acrylate, benzylidene di(meth) acrylate, 1,3-di(meth)acryloyloxy-2-propanol, hydroquinone di(meth)acrylate, di(meth)acrylate esters of trimethylolpropane which has preferably been alkoxylated, preferably ethoxylated, with 1 to 30 mol of alkylene oxide per hydroxyl group, thioethylene glycol di(meth)acrylate, thiopropylene glycol di(meth)acrylate, thiopolyethylene glycol di(meth)acrylate, thiopolypropylene glycol di(meth) acrylate, divinyl ethers, for example 1,4-butanediol divinyl ether, divinyl esters, for example divinyl adipate, alkadienes, for example butadiene or 1,6-hexadiene, divinylbenzene, di(meth)allyl compounds, for example di(meth)allyl phthalate or di(meth)allyl succinate, homo- and copolymers of di(meth)allyldimethylammonium chloride and homo- and copolymers of diethyl(meth)allylaminomethyl (meth)acrylate ammonium chloride, vinyl (meth)acryloyl compounds, for example vinyl (meth)acrylate, (meth)allyl (meth)acryloyl compounds, for example (meth)allyl (meth)acrylate, (meth)allyl (meth)acrylate ethoxylated with 1 to 30 mol of ethylene oxide per hydroxyl group, di(meth)allyl esters of polycarboxylic acids, for example di(meth)allyl maleate, di(meth)allyl fumarate, di(meth)allyl succinate or di(meth) allyl terephthalate, compounds having 3 or more ethylenically unsaturated, free-radically polymerizable groups, for example glyceryl tri(meth)acrylate, (meth)acrylate esters of glycerol which has been ethoxylated with preferably 1 to 30 mol of ethylene oxide per hydroxyl group, trimethylolpropane tri(meth)acrylate, tri(meth)acrylate esters of trimethylolpropane which has preferably been alkoxylated, preferably ethoxylated, with 1 to 30 mol of alkylene oxide per hydroxyl group, trimethacrylamide, (meth)allylidene di(meth)acrylate, 3-allyloxy-1,2-propanediol di(meth)acrylate, tri(meth) allyl cyanurate, tri(meth)allyl isocyanurate, pentaerythritol tetra(meth)acrylate, pentaerythritol tri(meth)acrylate, (meth) acrylic esters of pentaerythritol ethoxylated with preferably 1 to 30 mol of ethylene oxide per hydroxyl group, tris(2-hydroxyethyl)isocyanurate tri(meth)acrylate, trivinyl trimellitate, tri(meth)allylamine, di(meth)allylalkylamines, for example di(meth)allylmethylamine, tri(meth)allyl phosphate, tetra(meth)allylethylenediamine, poly(meth)allyl esters, tetra(meth)allyloxyethane or tetra(meth)allylammonium halides.

Preferred compounds of crosslinker class II are compounds which have at least two functional groups which can react in a condensation reaction (=condensation crosslinkers), in an addition reaction or in a ring-opening reaction with the functional groups of monomers ($\alpha$1) or ($\alpha$2), preferably with acid groups of monomers ($\alpha$1). These functional groups of the compounds of crosslinker class II are preferably alcohol, amine, aldehyde, glycidyl, isocyanate, carbonate or epichloro functions.

Examples of compounds of crosslinker class II include polyols, for example ethylene glycol, polyethylene glycols such as diethylene glycol, triethylene glycol and tetraethylene glycol, propylene glycol, polypropylene glycols such as dipropylene glycol, tripropylene glycol or tetrapropylene glycol, 1,3-butanediol, 1,4-butanediol, 1,5-pentanediol, 2,4-pentanediol, 1,6-hexanediol, 2,5-hexanediol, glycerol, polyglycerol, trimethylolpropane, polyoxypropylene, oxyethylene-oxypropylene block copolymers, sorbitan fatty acid esters, polyoxyethylene sorbitan fatty acid esters, pentaerythritol, polyvinyl alcohol and sorbitol, amino alcohols, for example ethanolamine, diethanolamine, triethanolamine or propanolamine, polyamine compounds, for example ethylenediamine, diethylenetriamine, triethylenetetramine, tetraethylenepentamine or pentaethylenehexamine, polyglycidyl ether compounds such as ethylene glycol diglycidyl ether, polyethylene glycol diglycidyl ether, glyceryl diglycidyl ether, glyceryl polyglycidyl ether, pentaerythrityl polyglycidyl ether, propylene glycol diglycidyl ether, polypropylene glycol diglycidyl ether, neopentyl glycol diglycidyl ether, hexanediol glycidyl ether, trimethylolpropane polyglycidyl ether, sorbitol polyglycidyl ether, diglycidyl phthalate, adipic acid diglycidyl ether, 1,4-phenylenebis(2-oxazoline), glycidol, polyisocyanates, preferably diisocyanates such as toluene 2,4-diisocyanate and hexamethylene diisocyanate, polyaziridine compounds such as 2,2-bishydroxymethylbutanol tris[3-(1-aziridinyl)propionate], 1,6-hexamethylenediethyleneurea and diphenylmethanebis-4,4'-N,N'-diethyleneurea, halogen peroxides, for example epichloro- and epibromohydrin and $\alpha$-methylepichlorohydrin, alkylene carbonates such as 1,3-dioxolan-2-one (ethylene carbonate), 4-methyl-1,3-dioxolan-2-one (propylene carbonate), 4,5-dimethyl-1,3-dioxolan-2-one, 4,4-dimethyl-1,3-dioxolan-2-one, 4-ethyl-1,3-dioxolan-2-one, 4-hydroxymethyl-1,3-dioxolan-2-one, 4-methyl-1,3-dioxan-2-one, 4,6-dimethyl-1,3-dioxan-2-one, poly-1,3-dioxolan-2-one, polyquaternary amines such as condensation products of dimethylamines and epichlorohydrin. Preferred compounds of crosslinker class II are additionally polyoxazolines such as 1,2-ethylenebisoxazoline, crosslinkers with silane groups, such as $\gamma$-glycidoxypropyltrimethoxysilane and $\gamma$-aminopropyltrimethoxysilane, oxazolidinones such as 2-oxazolidinone, bis- and poly-2-oxazolidinones and diglycol silicates.

Preferred compounds of class III include hydroxyl- or amino-containing esters of (meth)acrylic acid, for example 2-hydroxyethyl (meth)acrylate and 2-hydroxypropyl (meth) acrylate, and also hydroxyl- or amino-containing (meth) acrylamides or mono(meth)allyl compounds of diols.

The polyvalent metal cations of crosslinker class IV derive preferably from polyvalent cations. Preferred divalent cations derive from zinc, beryllium, alkaline earth metals such as magnesium, calcium, strontium, preference being given to magnesium. Further higher-valency cations usable in accordance with the invention are cations of aluminum, iron, chromium, manganese, titanium, zirconium and other transition metals, and also double salts of such cations or mixtures of the salts mentioned. Preference is given to using aluminum salts and alums and the different hydrates thereof, for example $AlCl_3 \times 6H_2O$, $NaAl(SO_4)_2 \times 12\ H_2O$, $KAl(SO_4)_2 \times 12\ H_2O$ or $Al_2(SO_4)_3 \times 14\text{-}18\ H_2O$. Particular preference is given to using $Al_2(SO_4)_3$ and hydrates thereof as crosslinkers of crosslinking class IV.

The superabsorbent particles used in the process according to the invention are preferably crosslinked by crosslinkers of the following crosslinker classes, or by crosslinkers of the following combinations of crosslinker classes: I, II, III, IV, I II, I III, I IV, I II III, I II IV, I III IV, II III IV, II IV or III IV. The above combinations of crosslinker classes are each a preferred embodiment of crosslinkers of a superabsorbent particle used in the process according to the invention.

Further preferred embodiments of the superabsorbent particles used in the process according to the invention are polymers which are crosslinked by any of the aforementioned crosslinkers of crosslinker class I. Among these, preference is given to water-soluble crosslinkers. In this context, particular preference is given to N,N'-methylenebisacrylamide, polyethylene glycol di(meth)acrylates, triallylmethylammonium chloride, tetraallylammonium chloride, and allyl nonaethylene glycol acrylate prepared with 9 mol of ethylene oxide per mole of acrylic acid.

As water-soluble polymers ($\alpha$4), the superabsorbent particles may comprise water-soluble polymers, such as partly or fully hydrolyzed polyvinyl alcohol, polyvinylpyrrolidone, starch or starch derivatives, polyglycols or polyacrylic acid, preferably incorporated in polymerized form. The molecular weight of these polymers is uncritical provided that they are water-soluble. Preferred water-soluble polymers are starch or starch derivatives or polyvinyl alcohol. The water-soluble polymers, preferably synthetic water-soluble polymers such as polyvinyl alcohol, can also serve as a graft base for the monomers to be polymerized.

Water ($\alpha$5) may be, for example, customary tap water, drinking water, distilled water, completely ion-free water, town water, process water or softened water. It is preferable to use softened water and/or process water.

The assistants ($\alpha$6) used may be organic or inorganic particles, for example odor binders, especially zeolites or cyclodextrins, skincare substances, surfactants, initiators or antioxidants.

The preferred organic assistants include cyclodextrins or derivatives thereof, and polysaccharides. Also preferred are cellulose and cellulose derivatives such as CMC, cellulose ethers. Preferred cyclodextrins or cyclodextrin derivatives are those compounds disclosed in DE-A-198 25 486 at page 3 line 51 to page 4 line 61. The aforementioned section of this published patent application is hereby incorporated by reference and is considered to form part of the disclosure of the present invention. Particularly preferred cyclodextrins are underivatized α-, β-, γ- or δ-cyclodextrins.

The inorganic particulate assistants used may be any materials which are typically used to modify the properties of water-absorbing polymers. The preferred inorganic assistants include sulfates such as $Na_2SO_4$, lactates, for instance sodium lactate, silicates, especially framework silicates such as zeolites, or silicates which have been obtained by drying aqueous silica solutions or silica sols, for example the commercially available products such as precipitated silicas and fumed silicas, for example Aerosils having a particle size in the range from 5 to 50 nm, preferably in the range from 8 to 20 nm, such as "Aerosil 200" from Evonik Industries AG, aluminates, titanium dioxides, zinc oxides, clay materials, and further minerals familiar to those skilled in the art, and also carbonaceous inorganic materials.

Preferred silicates include any natural or synthetic silicates disclosed as silicates in Hollemann and Wiberg, Lehrbuch der Anorganischen Chemie, Walter de Gruyter-Verlag, 91st-100th edition, 1985, on pages 750 to 783. The aforementioned section of this textbook is hereby incorporated by reference and is considered to form part of the disclosure of the present invention.

Particularly preferred silicates are the zeolites. The zeolites used may be all synthetic or natural zeolites known to those skilled in the art. Preferred natural zeolites are zeolites from the natrolite group, the harmotome group, the mordenite group, the chabazite group, the faujasite group (sodalite group) or the analcite group. Examples of natural zeolites are analcime, leucite, pollucite, wairakite, bellbergite, bikitaite, boggsite, brewsterite, chabazite, willhendersonite, cowlesite, dachiardite, edingtonite, epistilbite, erionite, faujasite, ferrierite, amicite, garronite, gismondine, gobbinsite, gmelinite, gonnardite, goosecreekite, harmotome, phillipsite, wellsite, clinoptilolite, heulandite, laumontite, levyne, mazzite, merlinoite, montesommaite, mordenite, mesolite, natrolite, scolecite, offretite, paranatrolite, paulingite, perlialite, barrerite, stilbite, stellerite, thomsonite, tschernichite or yugawaralite. Preferred synthetic zeolites are zeolite A, zeolite X, zeolite Y, zeolite P, or the product ABSCENTS®.

The zeolites used may be zeolites of what is called the "intermediate" type, in which the $SiO_2/AlO_2$ ratio is less than 10; the $SiO_2/AlO_2$ ratio of these zeolites is more preferably within a range from 2 to 10. In addition to these "intermediate" zeolites, it is also possible to use zeolites of the "high" type, which include, for example, the known "molecular sieve" zeolites of the ZSM type, and β-zeolite. These "high" zeolites are preferably characterized by an $SiO_2/AlO_2$ ratio of at least 35, more preferably by an $SiO_2/AlO_2$ ratio within a range from 200 to 500.

The aluminates used are preferably the naturally occurring spinels, especially common spinel, zinc spinel, iron spinel or chromium spinel.

Preferred titanium dioxide is pure titanium dioxide in the rutile, anatase and brookite crystal forms, and also iron-containing titanium dioxides, for example ilmenite, calcium-containing titanium dioxides such as titanite or perovskite.

Preferred clay materials are those which are disclosed as clay materials in Hollemann and Wiberg, Lehrbuch der Anorganischen Chemie, Walter de Gruyter-Verlag, 91st-100th edition, 1985, on pages 783 to 785. Particularly the aforementioned section of this textbook is hereby incorporated by reference and is considered to form part of the disclosure of the present invention. Particularly preferred clay materials are kaolinite, illite, halloysite, montmorillonite and talc.

Further inorganic fines preferred in accordance with the invention are the metal salts of the mono-, oligo- and polyphosphoric acids. Among these, preference is given especially to the hydrates, particular preference being given to the mono- to decahydrates and trihydrates. Useful metals include especially alkali metals and alkaline earth metals, preference being given to the alkaline earth metals. Among these, Mg and Ca are preferred and Mg is particularly preferred. In the context of phosphates, phosphoric acids and metal compounds thereof, reference is made to Hollemann and Wiberg, Lehrbuch der Anorganischen Chemie, Walter de Gruyter-Verlag, 91st-100th edition, 1985, on pages 651 to 669. The aforementioned section of this textbook is hereby incorporated by reference and is considered to form part of the disclosure of the present invention.

Preferred carbonaceous, but not organic assistants are those pure carbons which in Hollemann and Wiberg, Lehrbuch der Anorganischen Chemie, Walter de Gruyter-Verlag, 91st-100th edition, 1985 are referred to as graphites on pages 705 to 708. The aforementioned section of this textbook is hereby incorporated by reference and is considered to form part of the disclosure of the present invention. Particularly preferred graphites are synthetic graphites, for example coke, pyrographite, activated carbon or carbon black. The water-absorbing polymers obtained in the process according to the invention are preferably obtainable by first preparing a hydrogel polymer in particulate form from the aforementioned monomers and crosslinkers. This starting material for the water-absorbing polymers is produced, for example, by bulk polymerization which is preferably effected in kneading reactors such as extruders, solution polymerization, spray polymerization, inverse emulsion polymerization or inverse suspension polymerization. Preference is given to performing the solution polymerization in water as a solvent. The solution polymerization can be effected continuously or batchwise. The prior art discloses a wide spectrum of possible variations with regard to reaction conditions, such as temperatures, type and amount of the initiators, and of the reaction solution. Typical processes are described in the following patents: U.S. Pat. No. 4,286,082, DE 27 06 135, U.S. Pat. No. 4,076,663, DE 35 03 458, DE 40 20 780, DE 42 44 548, DE 43 23 001, DE 43 33 056, DE 44 18 818. The disclosures are hereby incorporated by reference and are thus considered to form part of the disclosure.

The initiators used to initiate the polymerization may be all initiators which form free radicals under the polymerization conditions and are typically used in the production of superabsorbents. These include thermal initiators, redox initiators and photoinitiators, which are activated by means of high-energy radiation. The polymerization initiators may be present dissolved or dispersed in a solution of inventive monomers. Preference is given to the use of water-soluble initiators.

The free-radical polymerization of step (ii) may be initiated in any conceivable manner. The polymerization is preferably initiated by redox initiation, thermal initiation or radiative initiation, more preferably by redox initiation.

Useful thermal initiators include all compounds which decompose to free radicals when heated and are known to those skilled in the art. Particular preference is given to thermal polymerization initiators having a half-life of less than 10 seconds, further preferably of less than 5 seconds at less than 180° C., further preferably at less than 140° C.

Peroxides, hydroperoxides, hydrogen peroxide, persulfates and azo compounds are particularly preferred thermal polymerization initiators. In some cases, it is advantageous to use mixtures of different thermal polymerization initiators. Among these mixtures, preference is given to those of hydrogen peroxide and sodium peroxodisulfate or potassium peroxodisulfate, which can be used in any conceivable ratio. Suitable organic peroxides are preferably acetylacetone peroxide, methyl ethyl ketone peroxide, benzoyl peroxide, lauroyl peroxide, acetyl peroxide, capryl peroxide, isopropyl peroxydicarbonate, 2-ethylhexyl peroxydicarbonate, t-butyl hydroperoxide, cumene hydroperoxide, t-amyl perpivalate, t-butyl perpivalate, t-butyl perneohexanoate, t-butyl isobutyrate, t-butyl per-2-ethylhexanoate, t-butyl perisononanoate, t-butyl permaleate, t-butyl perbenzoate, t-butyl 3,5,5-trimethylhexanoate and amyl perneodecanoate. Further preferred thermal polymerization initiators are: azo compounds such as azobisisobutyronitrile, azobisdimethylvaleronitrile, 2,2'-azobis(2-amidinopropane)dihydrochloride, azobisamidinopropane dihydrochloride, 2,2'-azobis(N,N-dimethylene)isobutyramidine dihydrochloride, 2-(carbamoylazo)isobutyronitrile and 4,4'-azobis(4-cyanovaleric acid). The compounds mentioned are used in customary amounts, preferably within a range from 0.01 to 5 mol %, preferably from 0.1 to 2 mol %, based in each case on the amount of the monomers to be polymerized.

The redox initiators comprise, as the oxidizing component, at least one of the above-specified per compounds, and, as the reducing component, preferably ascorbic acid, glucose, sorbose, mannose, ammonium hydrogensulfite, sulfate, thiosulfate, hyposulfite or sulfide, alkali metal hydrogensulfite, sulfate, thiosulfate, hyposulfite or sulfide, metal salts such as iron(II) ions or silver ions, or sodium hydroxymethylsulfoxylate. The reducing component used in the redox initiator is preferably ascorbic acid or sodium pyrosulfite. Based on the amount of monomers used in the polymerization, $1\times10^{-5}$ to 1 mol % of the reducing component of the redox initiator and $1\times10^{-5}$ to 5 mol % of the oxidizing component of the redox initiator are used. Instead of the oxidizing component of the redox initiator, or in addition thereto, it is possible to use one or more, preferably water-soluble, azo compounds.

If the polymerization is triggered by the action of high-energy radiation, it is customary to use what are called photoinitiators as the initiator. These may be, for example, what are called α-splitters, H-abstracting systems, or else azides. Examples of such initiators are benzophenone derivatives such as Michler's ketone, phenanthrene derivatives, fluorene derivatives, anthraquinone derivatives, thioxanthone derivatives, coumarin derivatives, benzoin ethers and derivatives thereof, azo compounds such as the abovementioned free-radical formers, substituted hexaarylbisimidazoles or acylphosphine oxides. Examples of azides are: 2-(N,N-dimethylamino)ethyl 4-azidocinnamate, 2-(N,N-dimethylamino)ethyl 4-azidonaphthyl ketone, 2-(N,N-dimethylamino)ethyl 4-azidobenzoate, 5-azido-1-naphthyl 2'-(N,N-dimethylamino)ethyl sulfone, N-(4-sulfonylazidophenyl) maleimide, N-acetyl-4-sulfonylazidoaniline, 4-sulfonylazidoaniline, 4-azidoaniline, 4-azidophenacyl bromide, p-azidobenzoic acid, 2,6-bis(p-azidobenzylidene) cyclohexanone and 2,6-bis(p-azidobenzylidene)-4-methylcyclohexanone. If they are used, the photoinitiators are employed typically in amounts of 0.01 to 5% by weight, based on the monomers to be polymerized.

Preference is given in accordance with the invention to using an initiator system consisting of hydrogen peroxide, sodium peroxodisulfate and ascorbic acid. In general, the polymerization is initiated with the initiators within a temperature range from 0° C. to 90° C.

The polymerization reaction can be triggered by one initiator or by a plurality of interacting initiators. In addition, the polymerization can be performed in such a way that one or more redox initiators are first added. Later in the polymerization, thermal initiators or photoinitiators are then applied additionally, and the polymerization reaction in the case of photoinitiators is then initiated by the action of high-energy radiation. The reverse sequence, i.e. the initial initiation of the reaction by means of high-energy radiation and photoinitiators or thermal initiators and initiation of the polymerization by means of one or more redox initiators later in the polymerization, is also conceivable.

The hydrogel polymer obtained in step (ii) is preferably in the form of a gel band and is preferably comminuted after polymerization and before step (iii). Comminution may be effected in particulate form via gel extruders or the like for example. In a further form, coarse gel comminution may also be effected during the polymerization in the kneader-reactor. Comminution is preferably followed by a first drying (step (iii)) preferably initially at a temperature in the range from 20 to 300° C., preferably in the range from 50 to 250° C. and more preferably in the range from 100 to 200° C. down to a water content of less than 40% by weight, preferably less than 20% by weight and more preferably less than 10% by weight, based in each case on the total weight of the hydrogel polymer. The drying is effected preferably in ovens or dryers known to those skilled in the art, for example in belt dryers, staged dryers, rotary tube ovens, fluidized bed dryers, pan dryers, paddle dryers or infrared dryers. In the present invention, the drying plates, belts, trays or other receptacles coming into contact with the hydrogel polymer may be coated, jetted, sprayed, painted, or brushed with a non-permanent anti-stick processing aid. Applying the process anti-stick aid is effected before the superabsorbent gel is fed onto the corresponding trays, belt, plates or metal bodies and may be affected once, continuously and/or semi-continuously.

In one preferred form of the present invention, the anti-stick processing aid is applied by a tube having a number of drilled holes where through the anti-stick processing aid flows/drips out of the drilled holes onto the trays. It may be advantageous for the anti-stick processing aid on the apparatus surface to be further distributed. This may be accomplished for example by for example means of cloths made for example by use of leather, leather substituent, textile or felt, and which are attached to a rotating axle arranged above the tray.

In a further embodiment, the anti-stick processing aid is sprayed onto or otherwise applied to the cloths of the abovementioned different materials via a tube having a number of drilled holes or a nozzle assembly.

According to the present invention, the further size reduction of the product after drying is preferably effected by dry grinding, preferably by dry grinding in a hammer mill, a pinned disk mill, a ball mill or a roll mill. In a further version of the present invention, the hydrogel polymer can also be milled by the combinations of two or more of the above-described mills.

In the present invention, sieving is preferably effected with sieving machines which operate linearly, circularly, planly or undulatingly. Drum sieve machines and moving grilles can also be used for sieving. What is decisive in relation to the use of sieving machines is a benign treatment of the particles to be sieved.

The hydrogel polymer dried in step (iii) is ground and sieved in step (iv).

The dimensions of polymer particles preferred in accordance with the invention are such that they have a mean particle size to ERT 420.2-02 in the range from 10 to 3000 µm, preferably 20 to 2000 µm and more preferably 150 to 850 µm or 150 to 600 µm after step (iv). In this context, it is especially preferable that the proportion of the polymer particles having a particle size within a range from 300 to 600 µm is at least 30% by weight, more preferably at least 40% by weight, further preferably at least 50% by weight and most preferably at least 75% by weight, based on the total weight of the water-absorbing polymer particles. In another embodiment of the inventive water-absorbing polymer structure, the proportion of the polymer particles having a particle size within a range from 150 to 850 µm is at least 50% by weight, more preferably at least 75% by weight, further preferably at least 90% by weight and most preferably at least 95% by weight, based on the total weight of the water-absorbing polymer particles.

The hydrogel polymers obtained in step (iv) are subjected to a surface post-crosslinking step (v) as described herein below.

In a preferred embodiment of the processes according to the invention, the water-absorbing polymers obtained are particles having an inner region and a surface region bordering the inner region. The surface region has a different chemical composition from the inner region, or differs from the inner region in a physical property. Physical properties in which the inner region differs from the surface region are, for example, the charge density or the degree of crosslinking.

These water-absorbing polymers having an inner region and a surface region bordering the inner region are preferably obtainable by post-crosslinking reactive groups close to the surface of the particles of the particulate hydrogel polymer. This post-crosslinking can be affected thermally, photo-chemically or chemically.

Preferred post-crosslinkers are the compounds of crosslinker classes II and IV mentioned in connection with the crosslinkers (α3).

Among these compounds, particularly preferred post-crosslinkers are diethylene glycol, triethylene glycol, polyethylene glycol, glycerol, polyglycerol, propylene glycol, diethanolamine, triethanolamine, polyoxypropylene, oxyethylene-oxypropylene block copolymers, sorbitan fatty acid esters, polyoxyethylenesorbitan fatty acid esters, trimethylolpropane, pentaerythritol, polyvinyl alcohol, sorbitol, 1,3-dioxolan-2-one (ethylene carbonate), 4-methyl-1,3-dioxolan-2-one (propylene carbonate), 4,5-dimethyl-1,3-dioxolan-2-one, 4,4-dimethyl-1,3-dioxolan-2-one, 4-ethyl-1,3-dioxolan-2-one, 4-hydroxymethyl-1,3-dioxolan-2-one, 4-methyl-1,3-dioxan-2-one, 4,6-dimethyl-1,3-dioxan-2-one, poly-1,3-dioxolan-2-one.

Particular preference is given to using ethylene carbonate as the post-crosslinker.

Preferred embodiments of the water-absorbing polymers are those which are post-crosslinked by crosslinkers of the following crosslinker classes or by crosslinkers of the following combinations of crosslinker classes: II, IV and II IV.

The post-crosslinker is preferably used in an amount within a range from 0.01 to 30% by weight, more preferably in an amount within a range from 0.1 to 20% by weight and further preferably in an amount within a range from 0.3 to 5% by weight, based in each case on the weight of the superabsorbent polymers in the post-crosslinking.

It is likewise preferred that the surface post-crosslinking is effected by contacting a solvent comprising preferably water, water-miscible organic solvents, for instance methanol or ethanol or mixtures of at least two thereof, and the post-crosslinker with the outer region of the hydrogel polymer particles. The hydrogel polymer particles are then typically heated to a temperature within a range from 30 to 300° C., more preferably within a range from 100 to 200° C. to complete the surface- or post-crosslinking reaction and remove excess water or other solvent used as a carrier. The contacting is preferably effected by spraying the mixture comprising, particularly consisting of, post-crosslinker and solvent onto the hydrogel polymer particles and then mixing the hydrogel polymer particles contacted with the mixture. The post-crosslinker is present in the mixture preferably in an amount within a range from 0.01 to 20% by weight, more preferably in an amount within a range from 0.1 to 10% by weight, based on the total weight of the mixture. It is additionally preferred that contact with the hydrogel polymer particles is effected in an amount within a range from 0.01 to 50% by weight, more preferably in an amount within a range from 0.1 to 30% by weight, based in each case on the weight of the hydrogel polymer particles.

Useful condensation reactions preferably include the formation of ester, amide, imide or urethane bonds, preference being given to the formation of ester bonds.

The inventive hydrogel polymer and/or water-absorbing polymers can additionally be admixed with further additives including those that act as effect substances. Additives may be added to the water-absorbing polymer at any stage of the production process, including into the monomer, the wet gel or the dried polymer before or after post-crosslinking. If the additive is sensitive to heat, abrasion or other steps of the manufacturing process, it may be preferable to be added after the post-crosslinking step as one of the last production steps. Or it may be that ease of addition, or activity or desired effect of the additive is improved. Such additions after post-crosslinking are generally referred to as finishing or finishing treatments.

By way of further additives, preference is given to flow additives or anti-caking compounds, for instance organic or inorganic pulverulent agents. These agents are preferably used in amounts within a range from 0 to 2% by weight, more preferably within a range from 0.1 to 1.5% by weight, based on the weight of the hydrogel polymer and/or of the water-absorbing polymer. Preferred flow additives are wood flour, pulp fibers, powdered bark, cellulose powder, mineral fillers such as perlite, synthetic fillers such as nylon powder, rayon powder, diatomaceous earth, bentonite, kaolin, zeolites, talc, loam, ash, carbon dust, magnesium silicates, fertilizers or mixtures of the substances. Finely divided fumed silica, as sold under the Aerosil® trade name by Evonik Industries AG, is preferred.

In a further preferred embodiment of the process according to the invention, the hydrogel polymer particles and/or the water-absorbing polymer particles are contacted with an effect substance additive, for example a polysugar, a polyphenolic compound, for example hydrolyzable tannins or a compound containing silicon-oxygen, microbe inhibiting substances, enzyme inhibitors, odor absorbers, odor maskers, anti-perspirants and the like, or a mixture of at least two effect substances based thereon. The effect substance can be added either in solid form (powder) or in dissolved form with a solvent, the effect substance being added not earlier than after step iii). In the context of the present invention, an effect substance additive is preferably understood to mean a substance which serves for odor inhibition.

According to the invention, polysugars are those by which the person skilled in the art understands those from the group of the familiar starches and derivatives thereof, celluloses and derivatives thereof, cyclodextrins. Cyclodextrins are preferably understood to mean α-cyclodextrin, β-cyclodextrin, γ-cyclodextrin or mixtures of these cyclodextrins.

Preferred compounds containing silicon-oxygen are zeolites. The zeolites used may be all synthetic or natural zeolites known to those skilled in the art. Preferred natural zeolites are zeolites from the natrolite group, the harmotome group, the mordenite group, the chabazite group, the faujasite group (sodalite group) or the analcite group. Examples of natural zeolites are analcime, leucite, pollucite, wairakite, bellbergite, bikitaite, boggsite, brewsterite, chabazite, willhendersonite, cowlesite, dachiardite, edingtonite, epistilbite, erionite, faujasite, ferrierite, amicite, garronite, gismondine, gobbinsite, gmelinite, gonnardite, goosecreekite, harmotome, phillipsite, wellsite, clinoptilolite, heulandite, laumontite, levyne, mazzite, merlinoite, montesommaite, mordenite, mesolite, natrolite, scolecite, offretite, paranatrolite, paulingite, perlialite, barrerite, stilbite, stellerite, thomsonite, tschernichite or yugawaralite. Preferred synthetic zeolites are zeolite A, zeolite X, zeolite Y, zeolite P, or the product ABSCENTS® from UOP.

The cations present in the zeolites used in the process according to the invention are preferably alkali metal cations such as $Li^+$, $Na^+$, $K^+$, $Rb^+$, $Cs^+$ or $Fr^+$ and/or alkaline earth metal cations such as $Mg^{2+}$, $Ca^{2+}$, $Sr^{2+}$ or $Ba^{2+}$.

The zeolites used may be zeolites of what is called the "intermediate" type, in which the $SiO_2/AlO_2$ ratio is less than 10; the $SiO_2/AlO_2$ ratio of these zeolites is more preferably within a range from 2 to 10. In addition to these "intermediate" zeolites, it is also possible to use zeolites of the "high" type, which include, for example, the known "molecular sieve" zeolites of the ZSM type, and beta-zeolite. These "high" zeolites are preferably characterized by an $SiO_2/AlO_2$ ratio of at least 35, more preferably by an $SiO_2/AlO_2$ ratio within a range from 200 to 500.

The zeolites are preferably used in the form of particles with a mean particle size within a range from 1 to 500 μm, more preferably within a range from 2 to 200 μm and further preferably within a range from 5 to 100 μm.

The effect substances are used in the processes according to the invention preferably in an amount within a range from 0.1 to 50% by weight, more preferably within a range from 1 to 40% by weight and further preferably in an amount within a range from 5 to 30% by weight, based in each case on the weight of the hydrogel polymer particles and/or water-absorbing polymer particles.

Preferred microbe-inhibiting substances are in principle all substances active against Gram-positive bacteria, for example 4-hydroxybenzoic acid and salts and esters thereof, N-(4-chlorophenyl)-N'-(3,4-dichlorophenyl)urea, 2,4,4'-trichloro-2'-hydroxydiphenyl ether (triclosan), 4-chloro-3,5-dimethylphenol, 2,2'-methylenebis(6-bromo-4-chlorophenol), 3-methyl-4-(1-methylethyl)phenol, 2-benzyl-4-chlorophenol, 3-(4-chlorophenoxy)-1,2-propanediol, 3-iodo-2-propynyl butylcarbamate, chlorhexidine, 3,4,4'-trichlorocarbonilide (TTC), antibacterial fragrances, thymol, thyme oil, eugenol, clove oil, menthol, mint oil, famesol, phenoxyethanol, glyceryl monocaprate, glyceryl monocaprylate, glyceryl monolaurate (GML), diglyceryl monocaprate (DMC), N-alkylsalicylamides, for example N-n-octylsalicylamide or N-n-decylsalicylamide.

Suitable enzyme inhibitors are, for example, esterase inhibitors. These are preferably trialkyl citrates such as trimethyl citrate, tripropyl citrate, triisopropyl citrate, tributyl citrate and especially triethyl citrate (Hydagen TM CAT, Cognis GmbH, Dusseldorf, Germany). The substances inhibit enzyme activity and as a result reduce odor formation. Further substances useful as esterase inhibitors are sterol sulfates or phosphates, for example lanosterol sulfate or phosphate, cholesterol sulfate or phosphate, campesterol sulfate or phosphate, stigmasterol sulfate or phosphate and sitosterol sulfate or phosphate, dicarboxylic acids and esters thereof, for example glutaric acid, monoethyl glutarate, diethyl glutarate, adipic acid, monoethyl adipate, diethyl adipate, malonic acid and diethyl malonate, hydroxycarboxylic acids and esters thereof, for example citric acid, malic acid, tartaric acid or diethyl tartrate, and zinc glycinate.

Suitable odor absorbers are substances which can absorb and substantially retain odor-forming compounds. They lower the partial pressure of the individual components and thus also reduce the rate of spread thereof. It is important that perfumes must remain unimpaired. Odor absorbers generally have no effect against bacteria. They contain, for example, as the main constituent, a complex zinc salt of ricinoleic acid or specific, substantially odor-neutral fragrances known to the person skilled in the art as "fixatives", for example extracts of labdanum or styrax or particular abietic acid derivatives. The function of odor maskers is fulfilled by odorants or perfume oils which, in addition to their function as odor maskers, impart their particular fragrance note to the deodorants. Examples of perfume oils include mixtures of natural and synthetic odorants. Natural odorants are extracts of flowers, stems and leaves, fruits, fruit skins, roots, woods, herbs and grasses, needles and twigs, and also resins and balsams. Additionally useful are animal raw materials, for example civet and castoreum. Typical synthetic odorant compounds are products of the ester, ether, aldehyde, ketone, alcohol and hydrocarbon type. Odorant compounds of the ester type are, for example, benzyl acetate, p-tert-butylcyclohexyl acetate, linalyl acetate, phenylethyl acetate, linalyl benzoate, benzyl formate, allyl cyclohexylpropionate, styrallyl propionate and benzyl salicylate. The ethers include, for example, benzyl ethyl ether; the aldehydes include, for example, the linear alkanals having 8 to 18 carbon atoms, citral, citronellal, citronellyloxyacetaldehyde, cyclamen aldehyde, hydroxycitronellal, lilial and bourgeonal; the ketones include, for example, the ionones and methyl cedryl ketone; the alcohols include anethole, citronellol, eugenol, isoeugenol, geraniol, linalool, phenylethyl alcohol and terpineol; the hydrocarbons include principally the terpenes and balsams. Preference is given, however, to using mixtures of different odorants which together produce a pleasing fragrance note. Suitable perfume oils are also essential oils of relatively low volatility which are usually used as aroma components, for example sage oil, camomile oil, clove oil, melissa oil, mint oil, cinnamon leaf oil, lime blossom oil, juniper berry oil, vetiver oil, olibanum oil, galbanum oil, labdanum oil and lavender oil. Preference is given to using bergamot oil, dihydromyrcenol, lilial, lyral, citronellol, phenylethyl alcohol, alpha-hexylcinnamaldehyde, geraniol, benzylacetone, cyclamen aldehyde, linalool, Boisambrene Forte, ambroxan, indole, Hedione, Sandelice, lemon oil, mandarin oil, orange oil, allyl amyl glycolate, cyclovertal, lavender oil, clary sage oil, beta-damascone, geranium oil bourbon, cyclohexyl salicylate, Vertofix Coeur, Iso-E-Super, Fixolide NP, Evernyl, iraldein gamma, phenylacetic acid, geranyl acetate, benzyl acetate, rose oxide, Romilat, Irotyl and Floramat, alone or in mixtures.

Anti-perspirants reduce the formation of perspiration by influencing the activity of the eccrine sweat glands, and thus counteract underarm wetness and body odor. Suitable astringent active antiperspirant ingredients are in particular salts of aluminum, zirconium or zinc. Suitable antihydrotically active ingredients of this type include, for example, aluminum chloride, aluminum chlorohydrate, aluminum dichlorohydrate, aluminum sesquichlorohydrate and complexed compounds thereof, for example with 1,2-propylene glycol, aluminum hydroxyallantoinate, aluminum chloride tartrate, aluminum zirconium trichlorohydrate, aluminum zirconium tetrachlorohydrate, aluminum zirconium pentachlorohydrate and their complexed compounds, for example with amino acids such as glycine.

Examples of further additives in the context of the present invention include anti-caking compounds, for example kaolin, Aerosils and the like, insoluble inorganic additives based on silicon, for example silicas or silica sols, surfactants, viscosity modifiers or the like, which are applied to the surface of the polymer particles or else react with the free polymer chains of the polymer particle.

Suitable apparatus for mixing or spraying is any which allows homogeneous distribution of a solution, powder, suspension or dispersion on or with the hydrogel polymer particles (PC) or water-absorbing polymers. Examples are Lödige mixers (manufactured by Gebrüder Lödige Maschinenbau GmbH), Gericke multi-flux mixers (manufactured by Gericke GmbH), DRAIS mixers (manufactured by DRAIS GmbH Spezialmaschinenfabrik Mannheim), Hosokawa mixers (Hosokawa Mokron Co., Ltd.), Ruberg mixers (manufactured by Gebr. Ruberg GmbH & Co. KG Nieheim), Hüttlin coaters (manufactured by BWI Hüttlin GmbH Steinen), fluidized bed dryers or spray granulators from AMMAG (manufactured by AMMAG Gunskirchen, Austria) or Heinen (manufactured by A. Heinen AG Anlagenbau Varel), Patterson-Kelly mixers, NARA paddle mixers, screw mixers, pan mixers, fluidized bed dryers or Schugi mixers. For contacting in a fluidized bed, it is possible to employ any fluidized bed processes which are known to those skilled in the art and appear to be suitable. For example, it is possible to use a fluidized bed coater.

The examples which follow serve for further illustration of the present invention, but without restricting it thereto.

Test Methods

Unless stated otherwise hereinafter, the measurements conducted herein are according to ERT methods. "ERT" stands for EDANA Recommended Test and "EDANA" for European Disposables and Nonwovens Association. All test methods are in principle, unless stated otherwise, conducted at an ambient temperature of 23±2° C. and a relative air humidity of 50±10%.

Centrifuge Retention Capacity (CRC)

The centrifuge retention capacity was determined by EDANA (European Disposables and Nonwovens Association) recommended test method No. WSP 241.3 "Centrifuge retention capacity".

Absorption Against a Pressure of 0.7 Psi (AAP)

The absorption against pressure (AAP) was determined by WSP 242.3 on the overall particle fraction. This method is also sometimes referred to as absorption under pressure.

Determination of Superabsorbent Gel Stickiness

A section of perforated dryer plate (26×19 cm, 304 L stainless steel, non-electropolished, standard surface roughness) was preheated to 60° C. in a circulating air drying cabinet (Heraeus Thermicon T or Kelvitron T). Thereafter, the respective aqueous solution of the anti-stick processing aid (about 5 g) was evenly applied to the hot dryer plate by means of a pumped spray bottle. Then, 300 g of freshly polymerized superabsorbent gel were distributed on the dryer plate and dried in the circulating air drying cabinet at 185° C. for 25 minutes. Thereafter, stickiness was evaluated by removing the dryer plate section from the oven and immediately inverting it with a 180° turn of the dryer plate section. It was observed if after inversion, all the dried gel was left sticking to the plate (sticky), some gel (partly) was left hanging (slightly sticky) to the plate or there was complete gel detachment/no sticking thereto. Classification was made by determining the amount of superabsorbent gel still present on the dryer plate 5 seconds after the 180° turn of said plate. A gel with more than 90 wt-% of the superabsorbent still on the plate after the turn plus 5 seconds was designated as "sticky". A gel with less than 10 wt-% of the superabsorbent still on the tray after the turn plus 5 seconds' delay time was designated as "non-sticky". When the superabsorbent quantity remaining after turning plus 5 seconds delay time was between 10 and 90 wt %, the gel was designated as "slightly sticky".

Determination of Surface Tension (ST)

Determination was by measurement as per the test method described in EP 1 493 453 A1 at page 12 paragraphs [0105] to [0111]. A Kruss K11 tensiometer with a Wilhelmy plate was used. The surface tension of the coated super absorbent material herein and also of the super absorbent polymers prior to coating, as used herein can be determined via ASTM 01331 and EDANA ERT 150. The method determines the surface tension of solutions of the coating agents (or other components), when washed off the coated super absorbent material or polymers. This test covers aqueous and non-aqueous solutions and also solutions in solvent mixtures. For the measurement (at 23° C. and 50% humidity) a Kruess Kruss K11 tensiometer can be used. Each measurement is done as follows: 0.50 gram of the material to be tested is placed in a beaker. 40 ml of test liquid, a 0.9% saline solution, is placed in a 50 ml beaker (completely clean: no surfactant containing) The saline solution is based on EDANA ERT150: 9.0 gr NaCl in 1.01 distilled, deonized water, whereof the surface tension should be more than 71 mN/m at 23° C. (to be checked before each test). Then, the sample material is added to the 50 ml beaker with the solution and this is stirred for 3 minutes. Then, after another 2 minutes, the surface tension of the material-solution mixture is measured with the Wilhelmy plate method, as known in the art. The test is repeated to get a duplicate and the average is calculated. If the difference between the two replicates is more than 1 mN/m, there is an error in the test and two new replicate test result need to be obtained, to calculate an average.

Self Ignition Temperature

The self ignition temperature was determined in a Grewer-oven according to Verein Deutscher Ingenieure test method VDI 2263, Sheet 1. The product (80% superabsorber, 20% additive) was filled in a small wire basket with a volume of 8 $cm^3$ and placed in a Grewer-oven. Graphite is used as a reference substance. The temperature of the oven was increased with a constant heating rate (1.2 K/min) and the self-ignition temperature observed.

EXAMPLES

Superabsorbent gels having a degree of neutralization of 60 mol % and 70 mol % were prepared.

Test 1 Polymer with 60 Mol % Degree of Neutralization (Gel A)

A monomer solution consisting of 640 g of acrylic acid neutralized to an extent of 60 mol % with 426.3 g of 50% NaOH, 893.8 g of water, 2.560 g of polyethylene glycol-300 diacrylate, 2.560 g of monoallyl polyethylene glycol-450 monoacrylate was freed of the dissolved oxygen by degassing with nitrogen and cooled to the start temperature of about 4° C. After the start temperature had been attained, an initiator solution (0.3 g of sodium peroxodisulfate in 10 g of water, 0.07 g of 35% hydrogen peroxide solution in 10 g of water and 0.015 g of ascorbic acid in 2 g of water) was added. An exothermic polymerization reaction took place. The adiabatic end temperature was about 100° C. The hydrogel formed was comminuted using a laboratory extruder (MEW 613, 5 mm hole plate, Machinenfabrik Dorhan).

Test 2 Polymer with 70 Mol % Degree of Neutralization (Gel B)

A monomer solution consisting of 640 g of acrylic acid neutralized to an extent of 70 mol % with 497.4 g of 50% NaOH, 822.8 g of water, 2.560 g of polyethylene glycol-300 diacrylate, 2.560 g of monoallyl polyethylene glycol-450 monoacrylate was freed of the dissolved oxygen by degassing with nitrogen and cooled to the start temperature of about 4° C. After the start temperature had been attained, an initiator solution (0.3 g of sodium peroxodisulfate in 10 g of water, 0.07 g of 35% hydrogen peroxide solution in 10 g of water and 0.015 g of ascorbic acid in 2 g of water) was added. An exothermic polymerization reaction took place. The adiabatic end temperature was about 100° C. The hydrogel formed was comminuted using a laboratory extruder (MEW 613, 5 mm hole plate, Machinenfabrik Dorhan).

For reference, tests 1+2 were each carried out without anti-stick processing aid.

Anti-stick processing aids were each used as aqueous solutions comprising Intrasol FS (oleyl alcohol, ethoxylated, Ashland), Comperlan COD 100 or RC-Amid (coconut fatty acid diethanolamide, Ashland), Servosoft XW 445 PP (N-methyltriethanolamine dimethylsulfate quaternized, Elementis), SPAN 20 (sorbitan monolaurate), potassium stearate, individually or in mixtures.

These materials were measured via a Grewer oven with a mixture of 80 wt % superabsorbent and 20 wt % anti-stick additive to determine the self-ignition temperature:

| Product | Self-ignition temperature ° C. |
|---|---|
| Intrasol FS | 260 |
| Servosoft XW 445 PP | 240 |
| SPAN 20 | 240 |
| RC-Amid/Comperlan COD 100 | 200 |
| Potassium stearate (comparative) | 170 |

As can be seen, potassium stearate is unsuitable for the instant invention as it has a self-ignition temperature below 200° C. in combination with superabsorbent polymer.

The effectiveness of the anti-stick processing aids in promoting release of the dried gel from the equipment surfaces after the drying process was tested according to the Determination of Superabsorbent Gel Stickiness test.

| Example No. | Aqueous solution of anti-stick processing aid wt % | Applied amount of anti-stick processing aid [g] | Superabsorbent gel | Stickiness |
|---|---|---|---|---|
| 1 | without anti-stick processing aid | N/A | A | sticky |
| 2 | without anti-stick processing aid | N/A | B | slightly sticky |
| 3 | Servosoft XW445PP, 5% | 5.7 | A | non-sticky |
| 4 | Servosoft XW445PP, 5% | 5.3 | B | non-sticky |
| 5 | Servosoft XW445PP, 1% | 6.2 | A | non-sticky |
| 6 | Servosoft XW445PP, 1% | 5.7 | B | non-sticky |
| 7 | Servosoft XW445PP, 0.2% | 5.3 | A | non-sticky |
| 8 | Servosoft XW445PP, 0.2% | 5.7 | B | non-sticky |
| 9 | Intrasol FS, 0.2% | 6.3 | A | non-sticky |
| 10 | Intrasol FS, 0.2% | 5.8 | B | non-sticky |
| 11 | Span 20, 0.2% | 6.0 | A | non-sticky |
| 12 | Span 20, 0.2% | 5.8 | B | non-sticky |
| 13 | Distilled water | 5.8 | A | sticky |
| 14 | Distilled water | 5.7 | B | non-sticky |

The dried superabsorbent samples were subsequently ground, sieved to 150-600 microns and post-crosslinked:

Respectively, 100 g of Examples 1 to 14 are coated with a solution of 1.0 g of ethylene carbonate and 3.0 g of deionized water. This is done by applying the solution with a syringe (0.45 mm cannula) to the polymer powder present in the mixer. The coated powder is subsequently heated in a drying cabinet at 170° C. for a period of 90 minutes (in the case of superabsorbent samples having a 70 mol % degree of neutralization) or at 170° C. for a period of 30 minutes (superabsorbent samples having a 60 mol % degree of neutralization). Retention, Absorption Against Pressure at 0.7 psi and surface tension were determined.

| Example No. | CRC 30/0/30 [g/g] | AAP 0.7 psi [g/g] | Surface tension [mN/m] |
|---|---|---|---|
| 1 | 27.1 | 23.4 | 71.4 |
| 2 | 26.9 | 24.0 | 70.8 |
| 3 | 27.6 | 23.8 | 71.5 |
| 4 | 27.5 | 23.4 | 70.1 |
| 5 | 27.1 | 23.5 | 71.2 |
| 6 | 27.2 | 23.1 | 70.8 |
| 7 | 29.0 | 25.0 | 70.1 |
| 8 | 30.5 | 25.1 | 71.1 |
| 9 | 28.5 | 24.5 | 69.9 |
| 10 | 29.5 | 25.1 | 70.9 |
| 11 | 27.1 | 23.0 | 71.0 |
| 12 | 28.9 | 24.8 | 69.9 |
| 13 | 27.6 | 24.6 | 71.2 |
| 14 | 29.4 | 24.9 | 70.7 |

As can be seen, the inventive anti-stick aids did not significantly affect the absorption performance of the final, surface-crosslinked superabsorbent powders and produced materials with excellent performance properties. Additionally, surface tension was not degraded to levels unsuitable for use in hygiene articles.

The invention claimed is:

1. A process for producing a water-absorbing polymer in an apparatus, comprising the steps of
   (i) mixing
   (α1) from 0.1 to 99.999% by weight of polymerizable, ethylenically unsaturated monomers containing acid groups, or salts thereof,
   (α2) from 0 to 70% by weight of polymerizable, ethylenically unsaturated monomers copolymerizable with (α1), (α3) from 0.001 to 10% by weight of one or more crosslinkers,
(α4) from 0 to 30% by weight of water-soluble polymers,
(α5) from 0 to 80% by weight of water, and
(α6) from 0 to 20% by weight of one or more assistants, where the sum of the weights of (α1) to (α5) is 100% by weight,
(ii) free-radical polymerization with crosslinking to form an untreated water-absorbing polymer,
(iii) drying the untreated water-absorbing polymer,
(iv) grinding and sieving the untreated water-absorbing polymer to size,
(v) surface postcrosslinking the ground and sieved untreated water-absorbing polymer and
(vi) finishing the water-absorbing polymer,
wherein an anti-stick processing aid is added either alone or in mixtures before and/or during the drying of the untreated water-absorbing polymer in step (iii) such that the anti-stick processing aid is added before step (iii) to the apparatus used subsequent to step (ii);
wherein the anti-stick processing aid is applied by spraying, jetting, painting, brushing or coating onto drying plates, belts, trays or other receptacles coming into contact with a hydrogel polymer; wherein said drying plates, belts, trays or other receptacles are made of metal and have a metallic surface; wherein the anti-stick processing aid is a non-permanent anti-stick processing aid;
wherein the surface tension of the resulting water-absorbing polymer is between 69.9 and 80 mN/m and, wherein the Centrifuge Retention Capacity (CRC) determined by EDANA test method No. WSP 241.3 of the resulting water-absorbing polymer is between 27.1 g/g and 30.5 g/g and wherein the Absorption against a pressure of 0.7 psi (AAP) determined in accordance with EDANA Method No. WSP242.3 of the resulting water-absorbing polymer is between 23.0 and 25.1 g/g, wherein the anti-stick processing aid is a cationic surfactant, and that less than 10% of the water-absorbing polymer resulting in process step (iii) stick to the apparatus used subsequent to step (ii); and
wherein less than 10% of the water-absorbing polymer resulting from process step (iii) stick to the dryer plate section, 5 seconds after a 180° turn according to the determination of water-absorbing polymer gel stickiness as defined herein.

2. A process for producing a water-absorbing polymer in an apparatus, comprising the steps of (i) mixing
(α1) from 0.1 to 99.999% by weight of polymerizable, ethylenically unsaturated monomers containing acid groups, or salts thereof,
(α2) from 0 to 70% by weight of polymerizable, ethylenically unsaturated monomers copolymerizable with (α1),
(α3) from 0.001 to 10% by weight of one or more crosslinkers,
(α4) from 0 to 30% by weight of water-soluble polymers,
(α5) from 0 to 80% by weight of water, and
(α6) from 0 to 20% by weight of one or more assistants, where the sum of the weights of (α1) to (α5) is 100% by weight,
(ii) free-radical polymerization with crosslinking to form a water-absorbing polymer,
(iii) drying the water-absorbing polymer,
(iv) grinding and sieving the water-absorbing polymer to size,
(v) surface post-crosslinking the ground and sieved water-absorbing polymer and
(vi) drying and finishing the water-absorbing polymer, wherein an anti-stick processing aid is added before and/or in steps (iii) such that the anti-stick processing aid is added before step (iii) to the apparatus used subsequent to step (ii) and the degree of neutralization of component (α1) is at most 70 mol %; and wherein the anti-stick processing aid is applied by spraying, jetting, painting, brushing or coating onto drying plates, belts, trays or other receptacles coming into contact with a hydrogel polymer; wherein said drying plates, belts, trays or other receptacles are made of metal and have a metallic surface; wherein the anti-stick processing aid is a non-permanent anti-stick processing aid;
wherein the surface tension of the resulting water-absorbing polymer is between 69.9 and 80 mN/m and wherein the Centrifuge Retention Capacity (CRC) determined by EDANA test method No. WSP 241.3 of the resulting water-absorbing polymer is between 27.1 g/g and 30.5 g/g and wherein the Absorption against a pressure of 0.7 psi (AAP) determined in accordance with EDANA Method No. WSP242.3 of the resulting water-absorbing polymer is between 23.0 and 25.1 g/g, wherein the anti-stick processing aid is a cationic surfactant, and that less than 10% of the water-absorbing polymer resulting in process step (iii) stick to the apparatus used subsequent to step (ii); and
wherein less than 10% of the water-absorbing polymer resulting from process step (iii) stick to the dryer plate section, 5 seconds after a 180° turn according to the determination of water-absorbing polymer gel stickiness as defined herein.

3. The process according to claim 1, characterized in that the degree of neutralization of component (α1) is at most 75 mol %.

4. The process according to claim 1, wherein the cationic surfactant is fatty acid esterquats.

5. The process according to claim 2, wherein the cationic surfactant is fatty acid esterquats.

* * * * *